(12) United States Patent
Wihlsson

(10) Patent No.: US 8,629,201 B2
(45) Date of Patent: Jan. 14, 2014

(54) PREPARING COMPOSITION FOR COMPOSITE LAMINATES

(75) Inventor: Lennart Wihlsson, Öjebynn (SE)

(73) Assignee: ABB Technology Ltd., Zürich (CH)

( * ) Notice: Subject to any disclaimer, the term of this patent is extended or adjusted under 35 U.S.C. 154(b) by 403 days.

(21) Appl. No.: 12/597,820

(22) PCT Filed: Apr. 25, 2008

(86) PCT No.: PCT/EP2008/055079
§ 371 (c)(1),
(2), (4) Date: Oct. 27, 2009

(87) PCT Pub. No.: WO2008/132169
PCT Pub. Date: Nov. 6, 2008

(65) Prior Publication Data
US 2010/0221968 A1    Sep. 2, 2010

(30) Foreign Application Priority Data
Apr. 27, 2007  (EP) .................................. 07107108

(51) Int. Cl.
*C08G 18/67*  (2006.01)
*C08G 18/50*  (2006.01)
*C08L 67/06*  (2006.01)
*C08G 18/10*  (2006.01)
*B32B 17/10*  (2006.01)

(52) U.S. Cl.
USPC ............. 523/500; 524/590; 524/875; 525/36; 528/75; 427/389.8; 442/180

(58) Field of Classification Search
USPC ....... 523/500; 524/590, 875; 525/36; 528/75; 427/389.8; 442/180
See application file for complete search history.

(56) References Cited

U.S. PATENT DOCUMENTS

| | | | |
|---|---|---|---|
| 3,933,728 A | 1/1976 | Henbest | |
| 4,260,538 A | 4/1981 | Iseler et al. | |
| 4,743,672 A * | 5/1988 | Goel | 528/44 |
| 4,895,895 A | 1/1990 | Osborne et al. | |
| 5,604,266 A | 2/1997 | Mushovic | |
| 5,840,781 A | 11/1998 | Dietrich | |
| 2003/0100636 A1* | 5/2003 | Yoshitake et al. | 524/47 |

FOREIGN PATENT DOCUMENTS

| | | |
|---|---|---|
| EP | 0-304-122 A1 | 2/1989 |
| EP | 0-805-183 A2 | 11/1997 |
| EP | 0985695 A | 3/2000 |
| JP | 55073718 A | 6/1980 |
| JP | 61192741 A | 8/1986 |
| WO | WO-00/23521 A1 | 4/2000 |

OTHER PUBLICATIONS

European Search Report dated Mar. 31, 2008 for application No. 07 10 7108.
PCT/ISA/210—International Search Report—Aug. 22, 2008.
PCT/ISA/237—Written Opinion of the International Searching Authority—Aug. 22, 2008.

* cited by examiner

*Primary Examiner* — Michael Pepitone
(74) *Attorney, Agent, or Firm* — Venable LLP; Eric J. Franklin

(57) ABSTRACT

A composition for production of a prepreg for manufacture of thermoset composite laminates, a method for the production of a prepreg, the prepreg, and a thermoset glass fiber reinforced composite laminate manufactured by curing the prepreg. The composition includes unsaturated polyesters or vinylesters, a catalyst, a thickening agent, and a crosslinking initiator. A first component of the unsaturated polyesters or vinylesters includes reactive groups that react with the thickening agent. A second component of the unsaturated polyesters or vinylesters does not include any groups that react with the thickening agent. The composition also includes a polyether polyol.

23 Claims, No Drawings

PREPARING COMPOSITION FOR COMPOSITE LAMINATES

CROSS-REFERENCE TO RELATED APPLICATIONS

This application claims priority to European patent application 07107108.8 filed 27 Apr. 2007 and is the national phase under 35 U.S.C. §371 of PCT/EP2008/055079 filed 25 Apr. 2008.

TECHNICAL FIELD

The invention relates to a composition for use in a prepreg material that gives good flow properties and needs a reduced time for thickening. The composition is for a resin paste for a prepreg, based on a mixture for moulding comprising unsaturated polyester or vinylester resins in combination with fibres. The invention also relates to a method for manufacturing a prepreg, and a thermoset glass fibre reinforced composite laminate.

BACKGROUND

The present invention relates to the field of thermoset glass fibre reinforced composite laminates, particularly for use as high voltage insulation materials. Such thermoset sheets are usually manufactured by exposing a prepreg sheet to a pressing step in which the prepreg sheet is formed to a desired shape and is cured under elevated pressure and temperature.

It is common prepreg technology to use thickening agents to obtain a prepreg material that can be handled for loading in moulds. Isocyanates react fast with hydroxyl groups, and are therefore often used as thickening agents together with hydroxyl containing polymers or together with polyols, to obtain a fast thickening cycle. The prepreg is manufactured by preparing a composition containing hydroxyl containing polymers and isocyanate, and incorporating glass fibre reinforcing material. A problem that may arise in connection with the manufacture of composite laminate is that inferior mould flow properties in the resin blend may cause defects such as voids and fibre misalignment in the prepreg during pressing. Moreover, hitherto known prepregs need to undergo a maturation that may last for several days, also when elevated temperatures are used, before they can be exposed to the pressing treatment.

There is a need for a prepreg composition that has improved mould flow properties and that allows a more efficient production of prepregs for the manufacture of thermoset glass fibre reinforced composite laminates.

SUMMARY OF THE INVENTION

The present invention aims at a composition for the production of prepregs, which has improved mould flow properties, and which utilises a new thickening technology, which allows for more efficient production of prepregs, and thus also gives an improved and more economical manufacture of thermoset glass fibre reinforced composite laminates.

According to the invention the new thickening technology is based on the use of a mixture of at least two different base thermoset polymer components, a first base thermoset polymer component, which contains groups that are reactive to a thickening agent used in the composition, a second base thermoset polymer component, which does not contain any groups reactive to the thickening agent. By this means the mould flow properties and the quality of the prepreg and the subsequent thermoset glass fibre reinforced composite laminate can be improved. The thickening level and thickening rate can also be controlled and improved, and the time and energy needed for the thickening phase can be reduced, by means of the inclusion of a polyether polyol and a catalyst in the composition.

The invention also relates to a method for the production of a prepreg, in which the inventive composition is used, and to a method of manufacture of a thermoset glass fibre reinforced composite laminates, in which the prepreg is the starting material.

DETAILED DESCRIPTION OF THE INVENTION

The composition of the present invention is for a resin paste for the production of a prepreg, which comprises unsaturated polyesters or vinylesters, catalyst, thickening agent, and crosslinking initiator. The unsaturated polyesters or vinylesters comprise two different polymer types, a first that reacts with the thickening agent and a second, which does not react with the thickening agent. By choosing a particular ratio the flow properties of the resin composition during pressing of the prepreg can be improved and adjusted to the conditions of the pressing. The composition further comprises a polyether polyol, which gives a rapid thickening at room temperature.

The composition for the manufacture of prepreg composite laminates comprises the following components: A) unsaturated polyesters or vinylesters that react with the thickening agent, OH-groups or other reactive groups; B), unsaturated polyesters or vinylesters, which do not react with the thickening agent; C) a catalyst; D) a thickening agent; E) crosslinking initiator; F) a polyether polyol. In addition it may also comprise G) release agents; H) fillers; and I) colouring agents.

Component A

Component A of the resin paste composition is comprised of unsaturated polyesters or vinylesters, which react with the thickening agent. This component is also referred to as polymer A in this description. The reactive groups of the polymers are primarily OH-groups, but polymers having other groups that are reactive with the thickening agent are also contemplated. For the simplicity reasons, the reactive groups of polymer A are hereinafter referred to as OH-groups. Polymer A may be present in an amount of 75-99% by weight of the total resin content, i.e. the total weight of Components A, B. The hydroxyl number of the polyesters or vinylesters is preferably between 15 and 60, which gives a sufficient thickening. The molecular weight of the polymers is preferably 5000-30 000. Examples of resins for use as component A used in this formulation are Polylite 680-000, Polylite 650-000 available from Reichhold and Aropol S599 from Ashland. Vinylesters for use as component A are Derakane 470-300 available from Ashland and Dion 9400 available from Reichhold.

Component B

Component B is comprised of unsaturated polyesters or vinyl esters having no groups that are reactive to the thickening agent. This component is also referred to as polymer B in this description. Component B may be present in an amount of 1-25% by weight of the total resin content, i.e. the total weight of Components A, B. Examples of resins for use as component B are Dion 388, Dion VE 1089, Polylite 31703-00 available from Reichhold.

Component C

The catalyst used for the composition is a polyurethane (PUR) catalyst based on bismuth or zirconium salts or other bismuth or zirconium compounds. Catalysts based on bismuth or zirconium octoates are preferred. The catalyst is preferably present in an amount of 0.1-2% by weight, based on the weight of the resin paste. Bismuth based catalysts, in particular bismuth octoate based catalysts, have a particularly strong catalyzing effect on the thickening, especially when a polyether polyol (component F) is present in the composition. Examples of suitable PUR-catalysts are Tegokat 722 available from Goldschmidt, or K-KAT 348 and K-KAT XC-6212 available from King Industries.

Component D

The thickening agent of the composition is an isocyanate, preferably a polymeric diphenyl methane diisocyanate (MDI). The content of polymeric MDI is preferably between 3-12 parts (weight) per 100 parts of total resin (A+B), to give an efficient thickening progress. The functionality of the isocyanate should preferably be 2.5-3.0. Examples are Desmodur 44V20 available from Büfa-Bayer and Lupranat M20 available from BASF or Suprasec 5025 available from Huntsman.

Thickening with isocyanates is a true chemical thickening resulting in a polymer network with covalent bonds, which can resist moulding temperatures up to 160° C. without breaking down. This property makes it suitable for prepreg production aimed for moulding laminates without use of closed moulding forms. In comparison thickening based on metal oxide creates a weak metal complex bonding that is broken down at temperatures above 90° C. and such thickening agents are for this reason not suitable for the process in this invention. Prepregs based on metal oxide thickening can only be used for moulding in closed moulds.

Component E

The crosslinking initiator is typically a peroxide, such as a perester or a peroxyketal for hot press moulding. Examples are Trigonox C, Trigonox 22-C-50 available from AKZO.

Component F

The polyether polyol (component F) preferably has a hydroxyl number of 250-1000, and is preferably present in an amount of 0.5-5% by weight of the total weight of the resin paste. The polyether polyol preferably comprises tertiary amine groups, which have a strong catalyzing effect on the thickening reaction. Examples of suitable polyetherpolyols are Lupranol 3402, Lupranol 3530 and Lupranol 3700 available from Elastogran-BASF and Voranol RA 800 available from Dow.

Components G, H, I

As release agent (G) may be used a stearate such as zinc or calcium stearate. Fillers (H) can be chalk, aluminium hydroxide, or zinc borate. Suitable chalk qualities can be obtained from Omya Group. Examples of suitable aluminium hydroxides are Martinal qualities available from Martinswerk. Colouring agents (I), such as colour pastes based on unsaturated polyester can also be added.

The composition may optionally also comprise styrene by which the viscosity of the resin paste can be controlled. The styrene will crosslink with the component A during the curing step. Styrenes are often included in commercially available polyester or vinylester resins.

Reinforcing Material

The glass fiber reinforcing material used for the prepreg may preferably be a woven glass fiber fabric, based either on glass fiber yarns or rovings with an area weight of 300-1200 grams/m$^2$. The use of woven fabrics gives high glass content to the product and leads to a high structural strength in the product. Powder bonded chopped standard mats or combinations of woven fabrics and bonded chopped mats can also used. Bonded mats are suitable when low glass content and high filler loading for fire resistance is desired. Suitable glass fiber reinforcing fabrics or mats can be obtained from Vetrotex and Ahlströms Glassfiber. Other reinforcing materials having properties similar to woven glass fiber fabrics or bonded glass fiber mats may also be contemplated.

A typical formulation of a prepreg of the invention is given in Table 1.

TABLE 1

| | Component | % by wt of the total prepreg |
|---|---|---|
| A | Unsaturated polyester/vinylester comprising OH-groups or other reactive groups | 20-40 |
| B | Unsaturated polyesters or vinylesters, without any reactive groups | 0.2-6.0 |
| C | PUR catalyst | 0.05 |
| D | Polymeric MDI based thickening agent | 1-3 |
| E | crosslinking initiator | 0.2-0.8 |
| F | polyether polyol | 0.15-0.7 |
| G | release agents | 0.2-1.0 |
| H | Fillers | 0-40 |
| I | colouring agents | 0.5-3 |
| J | glass fiber fabric/chopped glass mat | 35-75 |

In the method of manufacturing a prepreg for the production of thermoset composite laminates using the above composition, a resin paste is prepared by blending both unsaturated polyesters or vinylesters (reactive and non-reactive with the thickening agent), catalyst, thickening agent, crosslinking initiator and polyether polyol, i.e. components A, B, C, E and F, and optionally release agents and fillers (components G and H), in a dissolver under stirring, and mixing them to a paste. Thereafter, component D, and optionally component I, are added to the resin paste. The resin paste is transferred through a static mixer to an impregnation bath, in which a glass fiber reinforcement material is impregnated.

The chemical properties of commercially available unsaturated polyesters or vinylesters are normally not constant between different batches, due to variations in the production of the polyester/vinylester. Therefore, the amounts to be included in the resin paste composition may vary slightly depending on the properties of the polyester/vinylester A, and should preferably be evaluated each time a new batch is taken into use. This may be done by a simple test procedure in which it is evaluated how much of component D (polymeric MDI) is needed to reach a predetermined viscosity in a simplified resin paste composition including only components A and D. As stated above the thickening agent is preferably a polymeric diphenyl methane diisocyanate (MDI), because such an MDI has a higher functionality than standard MDI. For simplicity reasons the polymeric MDI is hereinafter referred to as isocyanate. Other thickening agents may however also be contemplated.

The reinforcement material impregnated with the paste in the impregnation bath is woven a glass fibre fabric, or a powder bonded chopped glass mat, or combinations of fabrics and chopped glass fiber mat and inorganic fillers. The viscosity of the resin paste at this stage is low enough to allow effective resin paste impregnation of the glass fibre fabric or chopped glass mat, suitably 10 000 meas. The impregnated fabric or mat is then provided with a protective surface foil on both surfaces, and is wound up to a roll.

In the production of the prepreg and the further processing of the prepreg to a thermoset composite laminate a number of chemical processes are involved. At first a thickening process takes place in which the viscosity of the resin paste after impregnation of the glass fiber fabric or mat should reach a level at which is easy to handle and allows pressing of the prepreg material. The thickening takes place during the maturation of the impregnated fabric or mat. At a viscosity of the resin paste in the prepreg of 70 000-80 000 Pas the prepreg is easy to handle and a uniform and adequate amount of resin paste is present throughout the prepreg. A prepreg comprising a resin paste having a composition according to the present invention can reach the desired viscosity in approximately 24-48 hours at room temperature. The prepreg is then ready for pressing in a press for the manufacture of a thermoset composite laminate.

The unsaturated polyesters or vinylesters comprising OH-groups (A) and the thickening agent (D) (isocyanate) participate in the thickening reaction. The unsaturated polyesters or vinylesters that are not reactive to isocyanate do not participate in this reaction. The reaction is catalysed by the catalyst and the polyol. It has been found that the catalysing action is particularly pronounced when a bismuth catalyst is used in combination with a polyether polyol, especially when the polyether polyol comprises tertiary amine groups. The catalyst is preferably a bismuth based catalyst. The high functionality of the isocyanate, preferably 2.5-3.0 (i.e. 2.5-3.0 isocyanate groups per molecule), renders the polyether polyol highly reactive to polymer A, so that it rapidly forms chemical networks with polymer A together with the polyether polyol. The tertiary amine groups additionally catalyses the thickening reaction, and gives a very rapid and effective thickening.

The total amount of unsaturated polyesters or vinylesters (A+B) in the resin paste is substantially the same as in a conventional prepreg resin blend. In the prepreg composition of the present invention, a part of the conventionally used unsaturated polyesters or vinylesters A, which are reactive to isocyanate, is replaced by unsaturated polyesters or vinylesters B that are not reactive to isocyanate. By choosing the ratio of component A to component B the mould flow properties of the resin paste and the thickening process can be controlled and optimised. Since polymer B is substantially not reactive to isocyanate (D), and thus does not participate in the thickening reaction, the molecules of this polymer floats freely within the resin paste, and is not chemically bonded to any other components, whereas polymer A is chemically bonded to isocyanate in the network. This highly improves the mould flow properties, because polymer B has the capability of compensate for uneven polymer distribution in the prepreg, and filling voids in the network of polymer A and isocyanate (D), which reduces defects such as voids and fibre misalignment in the prepreg. Polymer B makes the prepreg softer and thus contributes to the manageability of the prepreg. A conventional prepreg comprising only polymer A and no polymer B is much stiffer and is more difficult to handle. There is also a risk that blisters and/or voids arise in the material during the pressing step for a prepreg of the conventional type due to the stiffness of the material. The risk for blisters and/or voids is substantially avoided when the resin paste of the inventive composition is used, since the resin paste is softer as result of the freely movable polymer B molecules. The final product will thus be of a higher, more even and more predictable quality, and the reject quantity is minimised.

At the impregnation step the viscosity of the resin paste is approx. 10 Pas. The time needed for production of a 200 kg prepreg is typically 13 minutes. With the use of the above resin paste comprising polyether polyol in combination with a bismuth based catalyst, a viscosity of the resin paste of 40-150 Pas can be obtained already after 15 minutes. At this viscosity, substantially no resin paste bleeds out of the roll and an even distribution of resin paste throughout the prepreg roll is thereby ensured. With the use of a resin paste comprising the same components but without the combination of polyether polyol and bismuth based catalyst the viscosity of the resin paste is approx. 15 Pas after 15 minutes. At such a low viscosity the resin paste bleeds or is pressed out of the prepreg roll, which may lead to an uneven resin content and/or insufficient amount of resin in the prepreg.

A prepreg produced from the above resin paste comprising polyether polyol in combination with a bismuth based catalyst maturates to the desired viscosity of 70 000-80 000 Pas in approximately 24-48 hours, at room temperature. In comparison, a conventional prepreg based on a reference resin paste comprising the same components except polyether polyol and bismuth based catalyst, would need 72-120 hours at 40° C. to reach the desired viscosity. At room temperature the conventional prepreg would have to maturate for about 140-240 hours. The prepreg of the present invention can thus be produced in a much shorter time, and does additionally not require heated spaces for maturation, but can be left for maturation in the same area as used for the prepreg production. This saves both time and energy, and results in a very cost effective production of prepregs, as well as effective manufacture of composite laminates. After maturation, the prepregs are directly transferred to a processing step for manufacture of thermoset glass fibre reinforced composite laminates, or they can be stored until needed.

In the manufacture of thermoset glass fibre reinforced composite laminates, the protective foil is removed and one or more prepreg sheets, the number of sheets depending on the desired thickness of the end product, are placed in a press, between pressing plates. The pressing is performed at 7-9 MPa, with a temperature cycle, in which the temperature increases from ambient temperature (approx. 20° C.) to a temperature of 80-90° C., at which curing of the resins occur. During the processing of the prepreg to a thermoset composite laminate a curing reaction takes place, in which the unsaturated polyesters or vinylesters A and B, and the crosslinking initiator participate. Both polymer A and polymer B are thereafter chemically bonded in the product. The curing reaction generates heat, which is registered by thermocouples. When no further heat is generated, the curing reaction is complete, and the temperature is then approx. 130° C. Thereafter, a final post curing cycle is performed, using a temperature of approx. 150° C., in which the laminate reaches its final curing. The press is the cooled and the thermoset glass fibre reinforced composite laminates can be taken out of the press. The resulting composite laminate can then be mechanically machined to desired final products.

EXAMPLE

The viscosities as a function of time for seven different resin pastes were evaluated in a test in which resin pastes were prepared. All resin pastes (I-VI) comprise polymer A, polymer B, catalyst (bismuth or zirconium) (C), thickening agent (isocyanate) (D), polyether polyol (F) and filler (H). Reference resin pastes were prepared for comparison. Reference resin paste (a) (Ref. a) comprises polymer A, thickening agent (isocyanate) (D), and filler (H), reference resin paste (b) (Ref. b) comprises polymer A, polymer B, catalyst (bismuth) (C), thickening agent (isocyanate) (D), and filler (H), and reference resin paste (c) (Ref. c) comprises polymer A, polymer B, thickening agent (isocyanate) (D), polyether polyol (F) and filler (H). Since the resins of this test were not intended for curing, no crosslinking agent was included. The compositions of the resin pastes are shown in Table 2, in which amounts are given in weight parts per 100 parts resin. Two different catalysts were compared, C1 based on bismuth and C2 based on zirconium. After blending and mixing, the resin pastes were the maturated at room temperature, approx. 20°

C. The viscosity of the resin pastes as a function of time is shown in Table 3. The results show that the reaction velocity of the thickening reaction is considerably increased by the use of polyether polyol in combination with a catalyst, and that this is particularly pronounced for the bismuth catalyst. The polyether polyol used (Lupranol 3700) contains tertiary amine groups. The resin pastes of the reference examples, among which Ref. a does not comprise neither catalyst (C), nor polyether polyol (F); Ref. b comprises catalyst (C1), but not polyether polyol (F); and Ref.c comprises polyether polyol (F), but not catalyst (C), all show unsatisfactory results, which can also be seen in Table 3.

TABLE 2

| | Resin paste component | Resin paste compositions | | | | | | | | |
|---|---|---|---|---|---|---|---|---|---|---|
| | | Ref. a | Ref. b | Ref. c | I | II | III | IV | V | VI |
| A | Polylite 680-000 | 100 | 95 | 95 | 95 | 95 | 95 | 95 | 95 | 95 |
| B | Dion VE1089 | 0 | 5 | 5 | 5 | 5 | 5 | 5 | 5 | 5 |
| C1 | Tegokat 722 (bismuth) | 0 | 0.4 | 0 | 0.4 | 0.8 | 1.2 | 1.6 | 0 | 0 |
| C2 | K-KAT XC6212 (zirconium) | 0 | 0 | 0 | 0 | 0 | 0 | 0 | 1.0 | 2.0 |
| D | Desmodur 44V20 (MDI) | 8.0 | 8.0 | 8.0 | 8.0 | 8.0 | 8.0 | 8.0 | 8.0 | 8.0 |
| F | Lupranol 3700 (polyether polyol) | 0 | 0 | 1.5 | 1.5 | 1.5 | 1.5 | 1.5 | 1.5 | 1.5 |
| H | Aluminium hydroxide | 100 | 100 | 100 | 100 | 100 | 100 | 100 | 100 | 100 |

TABLE 3

| Viscosity (Pas) of the resin paste compositions in table 2 | | | | | | | | | |
|---|---|---|---|---|---|---|---|---|---|
| Time | Ref. a | Ref. b | Ref. c | I | II | III | IV | V | VI |
| 0 min | 8 | 7 | 9 | 10 | 10 | 12 | 14 | 9 | 8 |
| 10 min | 22 | 23 | 21 | 32 | 30 | 52 | 60 | 18 | 28 |
| 15 min | 25 | 25 | 23 | 38 | 50 | 70 | 100 | 30 | 40 |
| 20 min | 30 | 32 | 29 | 44 | 64 | 102 | 130 | 40 | 50 |
| 30 min | 42 | 45 | 44 | 72 | 112 | 176 | 208 | 58 | 75 |
| 60 min | 56 | 60 | 56 | 200 | 308 | 472 | 556 | 120 | 220 |
| 24 h | <10 000 | 2500 | 1200 | 54 000 | 62 000 | 76 000 | >80 000 | 35 000 | 60 000 |
| 48 h | <20 000 | | | 74 000 | 76 000 | >80 000 | | | |
| 72 h | <30 000 | | | 74 000 | >80 000 | | | | |
| 96 h | | | | >80 000 | | | | | |

While the invention has been explained in relation to its preferred embodiments, it is to be understood that various modifications thereof will become apparent to those skilled in the art upon reading of the description. Therefore it is to be understood that the invention disclosed herein is intended to cover such modification as fall within the scope of the appended claims.

The invention claimed is:

1. A composition for production of a prepreg for manufacture of thermoset composite laminates, the composition comprising:
   unsaturated polyesters or vinylesters,
   a catalyst comprising a polyurethane catalyst based on a bismuth compound,
   a thickening agent comprising an isocyanate,
   a crosslinking initiator, and
   a polyether polyol comprising tertiary amine groups,
   wherein a first component of the unsaturated polyesters or vinylesters comprises reactive groups that react with the thickening agent, and a second component of the unsaturated polyesters or vinylesters does not comprise any groups that react with the thickening agent,
   wherein a reaction between the first component of the unsaturated polyesters or vinylesters and the thickening agent is catalysed by the catalyst and the polyether polyol in a first reaction step; and
   wherein both the first component and the second component of the unsaturated polyesters or vinylesters and the crosslinking initiator participate in a curing reaction in a second reaction step.

2. The composition according to claim 1, wherein the polyesters or vinylesters of the first component have a hydroxyl number of 15-60.

3. The composition according to claim 1, wherein the polyether polyol comprises tertiary amine groups and has a hydroxyl number of 250-1000.

4. The composition according to claim 1, wherein an amount of unsaturated polyesters or vinyl esters having no groups reacting with the thickening agent is 1-25% by weight of a total resin content.

5. The composition according to claim 1, wherein the thickening agent comprises a polymeric diphenyl methane diisocyanate.

6. The composition according to claim 1, further comprising:
   a release agent,
   fillers, and
   colouring agents.

7. A method for production of a prepreg for production of thermoset composite laminates using a composition comprising
   unsaturated polyesters or vinylesters,
   a catalyst comprising a polyurethane catalyst based on a bismuth compound,
   a thickening agent comprising an isocyanate,
   a crosslinking initiator,
   a polyether polyol comprising tertiary amine groups,
   release agent, fillers, and
   coloring agents,
   wherein a first component of the unsaturated polyesters or vinylesters comprises reactive groups that react with the thickening agent, and a second component of the unsaturated polyesters or vinylesters does not comprise any groups that react with the thickening agent, wherein a reaction between the first component of the unsaturated polyesters or vinylesters and the thickening agent is catalysed by the catalyst and the polyether polyol in a first reaction step; and wherein both the first component and the second component of the unsaturated polyesters or vinylesters and the crosslinking initiator participate in a curing reaction in a second reaction step, the method comprising:

blending unsaturated polyesters or vinylesters, catalyst, the polyether polyol and cross-linking initiator, and optionally release agent and fillers, and mixing them to a resin paste;

adding the thickening agent, and optionally the coloring agents, to the resin paste; and impregnating a glass fibre fabric or bonded chopped glass mat, or a combination thereof, with the paste in an impregnation bath.

8. A method for production of a prepreg for production of thermoset composite laminates using a composition comprising unsaturated polyesters or vinylesters,
a catalyst comprising a polyurethane catalyst based on a bismuth or zirconium compound,
a thickening agent comprising an isocyanate,
a crosslinking initiator,
a polyether polyol,
release agent, fillers, and
coloring agents, wherein a first component of the unsaturated polyesters or vinylesters comprises reactive groups that react with the thickening agent, and a second component of the unsaturated polyesters or vinylesters does not comprise any groups that react with the thickening agent, wherein a reaction between the first component of the unsaturated polyesters or vinylesters and the thickening agent is catalysed by the catalyst and the polyether polyol in a first reaction step; and wherein both the first component and the second component of the unsaturated polyesters or vinylesters and the crosslinking initiator participate in a curing reaction in a second reaction step, the method comprising:

blending unsaturated polyesters or vinylesters, catalyst, the polyether polyol and cross-linking initiator, and optionally release agent and fillers, and mixing them to a resin paste;

adding the thickening agent, and optionally the coloring agents, to the resin paste;

impregnating a glass fibre fabric or bonded chopped glass mat, or a combination thereof, with the paste in an impregnation bath;

providing the impregnated fabric or mat with a protective surface foil on both surfaces; and winding the impregnated fabric or mat into a roll.

9. A method for production of a prepreg for production of thermoset composite laminates using a composition comprising unsaturated polyesters or vinylesters,
a catalyst comprising a polyurethane catalyst based on a bismuth or zirconium compound,
a thickening agent comprising an isocyanate,
a crosslinking initiator,
a polyether polyol,
release agent, fillers, and
coloring agents, wherein a first component of the unsaturated polyesters or vinylesters comprises reactive groups that react with the thickening agent, and a second component of the unsaturated polyesters or vinylesters does not comprise any groups that react with the thickening agent, wherein a reaction between the first component of the unsaturated polyesters or vinylesters and the thickening agent is catalysed by the catalyst and the polyether polyol in a first reaction step; and wherein both the first component and the second component of the unsaturated polyesters or vinylesters and the crosslinking initiator participate in a curing reaction in a second reaction step, the method comprising:

blending unsaturated polyesters or vinylesters, catalyst, the polyether polyol and cross-linking initiator, and optionally release agent and fillers, and mixing them to a resin paste;

adding the thickening agent, and optionally the coloring agents, to the resin paste;

impregnating a glass fibre fabric or bonded chopped glass mat, or a combination thereof, with the paste in an impregnation bath; and maturating the impregnated fabric or mat for 24-48 hours at room temperature, to obtain a viscosity of the resin paste of 70 000-80 000 Pas.

10. A prepreg for manufacture of thermoset composite laminates produced by the method according to claim 7.

11. A thermoset glass fibre reinforced composite laminate manufactured by curing the prepreg according to claim 10 in a pressing step under a pressure of 7-9 MPa, at 80-90° C., and in a final curing step at 150° C.

12. A prepreg composition prepared by blending:
unsaturated polyesters or vinylesters,
a polyurethane catalyst based on a bismuth compound,
a cross-linking initiator,
a polyether polyol comprising tertiary amine groups, and
optionally release agents and fillers and mixing them to a resin paste;
adding thickening agent, and optionally coloring agents to the resin paste;
impregnating a glass fibre fabric or bonded chopped glass mat, or a combination thereof, with the paste in an impregnation bath; and
the composition comprising polyether polyol comprising tertiary amine groups in combination with a bismuth based catalyst.

13. The composition according to claim 1, wherein the catalyst is a bismuth octoate based catalyst.

14. A prepreg, comprising:
a reinforcing material impregnated with a resin paste comprising unsaturated polyesters or vinyl esters not comprising any groups reacting with a thickening agent comprising an isocyanate;
a cross-linking initiator; and
a reaction product of a thickening agent comprising an isocyanate and unsaturated polyesters or vinyl esters comprising reactive groups that react with said thickening agent, wherein said thickening agent and unsaturated polyesters or vinyl esters have been catalyzed by a polyether polyol comprising tertiary amine groups and a catalyst comprising a polyurethane catalyst based on a bismuth or zirconium compound to obtain said reaction product.

15. The prepreg according to claim 14, wherein the resin paste has a viscosity of the resin paste of 70 000-80 000 Pas.

16. The prepreg according to claim 14, wherein the polyesters or vinyl esters of comprising reactive groups that react with the thickening agent have a hydroxyl number of 15-60.

17. The prepreg according to claim 14, wherein the polyether polyol has a hydroxyl number of 250-1000.

18. The prepreg according to claim 14, wherein the amount of unsaturated polyesters or vinyl esters having no groups reacting with the thickening agent is 1-25% by weight of a total resin content.

19. The prepreg according to claim 14, wherein the thickening agent comprises a polymeric diphenyl methane diisocyanate.

20. The prepreg according to claim 14, further comprising:
at least one of release agent;
at least one coloring agent; and
at least one filler.

21. The prepreg according to claim 14, wherein the reinforcing material is a glass fiber fabric or bonded chopped glass mat.

22. The prepreg according to claim 14, wherein the impregnated reinforcing material comprises a protective surface foil on an upper surface and a lower surface.

23. The prepreg according to claim 14, wherein the impregnated reinforcing material has been wound into a roll.

* * * * *

UNITED STATES PATENT AND TRADEMARK OFFICE
CERTIFICATE OF CORRECTION

PATENT NO. : 8,629,201 B2
APPLICATION NO. : 12/597820
DATED : January 14, 2014
INVENTOR(S) : Lennard Wihlsson Page 1 of 1

It is certified that error appears in the above-identified patent and that said Letters Patent is hereby corrected as shown below:

Title Page, item (75) Inventor should read as follows:

Lennard Wihlsson, ~~Öjebynn~~ Öjebyn (SE)

Title Page, item (30) Foreign Application Priority Data should read as follows:

April 27, 2007  (EP) ................................................ 07107108.8

Signed and Sealed this
Eighteenth Day of March, 2014

Michelle K. Lee
*Deputy Director of the United States Patent and Trademark Office*